T. Castor.
Safety Car.
No. 45,316. Patented Dec. 6, 1864.

Witnesses.

Inventor.

UNITED STATES PATENT OFFICE.

THOMAS CASTOR, OF PHILADELPHIA, PENNSYLVANIA.

IMPROVED RAILWAY-CAR.

Specification forming part of Letters Patent No. 45,316, dated December 6, 1864.

*To all whom it may concern:*

Be it known that I, THOMAS CASTOR, of Philadelphia, Pennsylvania, have invented an Improvement in Railway-Cars; and I do hereby declare the following to be a full, clear, and exact description of the same, reference being had to the accompanying drawings and to the letters of reference marked thereon.

My invention consists, first, in dogs so constructed and so hung to a railway-car in respect to the wheels that they will effectively remove objects from the track and prevent them from being acted on by the wheels; secondly, in the combination of the said dogs with bars attached to the axle so that the dogs will always be maintained at the same distance above the track; thirdly, in such a combination of parts described hereinafter as will insure the effective operation of the dogs.

In order to enable others skilled in the art to make and use my invention, I will now proceed to describe its construction and operation.

Figure 1:
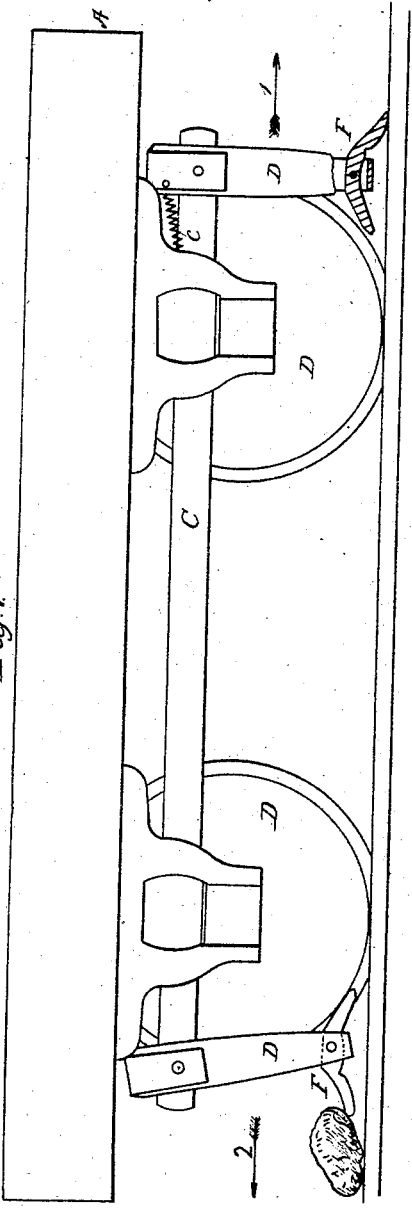

On reference to the accompanying drawings, which form a part of this specification. Figure 1 is a side view of sufficient of a railway-car to show my improvement; and Fig. 2, an end view, partly in section.

Similar letters refer to similar parts throughout the several views.

Figure 2:
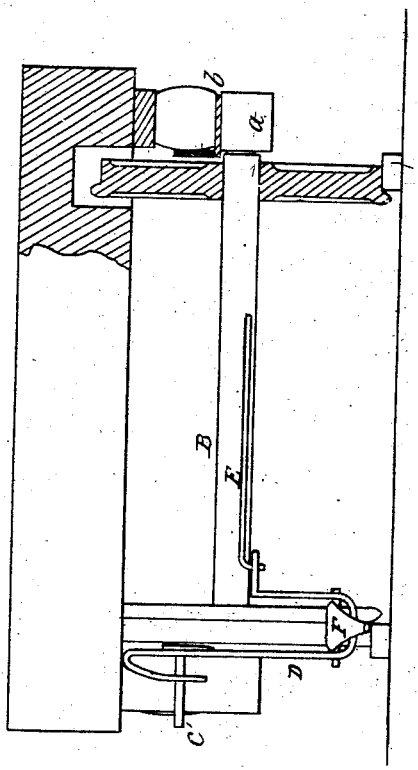

A represents the frame of the car, and B the axles, which turn in suitable boxes, a, adapted to hangers C, the axles being provided with the usual flanged wheels, D D. Between the wheels and hangers, on each side of the car, is situated a bar, c, the ends of which project beyond the outer edges of the wheels, and near each end of each bar is secured an L-shaped plate, b, which is attached to the axle box a, as best shown in Fig. 2.

Near each end of each bar c, an arm, D, is hung loosely, the lower end of each arm being bent upward, so as to form a yoke, to the inner arm of which is attached one end of a rod, E, the other end of the said rod being connected to the yoke on the opposite side of the car.

Within the yoke formed by the bent portion of each arm D a dog, F, of the form shown in the drawings, is hung loosely, the said dog occupying a position over the rail directly in front of the wheel, the outer arm of the dog being somewhat longer and heavier than the inner arm, for a purpose described hereinafter.

So long as the car meets with no obstruction in its forward motion the arms D will hang perpendicular to the rails, and the outer ends of the dogs will bear lightly on and slide over the treads of the same, and, should even the smallest or lightest object lie upon the rail, the dog will push the same from the track. When, however, the end of the dog engages with an object which is too large or heavy to be readily pushed from the rail, the end of the arm D will be moved back toward the wheel, so that the inner arm of the dog shall come in contact with the periphery of the same, and be thereby depressed, the other arm being consequently raised so as to lift the object from the track and throw it to one side or the other. Should the object, however, be so large as to bear upon the end of the dog after the latter is raised, the dog, by its continued pressure against the periphery of the wheel, will act as a brake, and, by suspending or interrupting the revolution of the wheel, tend to retard the further progress of the car, the arm D preventing the object on the dog from coming in contact with the edge of the wheel.

As the bars c are attached to the axle boxes, it will be apparent that the distance between the dogs and the rails will not be affected in any manner by the movements of the body of the car.

When it is desired to prevent the arm D from being too readily moved toward the wheel, a spiral spring, e, may be attached to the arm and to some stationary portion of the car, the said spring tending to maintain the arm in its perpendicular position.

I claim as my invention and desire to secure by Letters Patent—

1. A dog, F, so constructed, and so hung to a railway-car in respect to the wheel that it will operate on obstructions on the rail as set forth.

2. The combination of the said dog F with a bar attached to the axle boxes as set forth.

3. The arm L, dog F, and bar c, combined and arranged in respect to a railway-car substantially as specified.

In testimony whereof I have signed my name to this specification in the presence of two subscribing witnesses.

THOS. CASTOR.

Witnesses:
CHARLES E. FOSTER,
JOHN WHITE.